United States Patent Office 3,322,458
Patented May 30, 1967

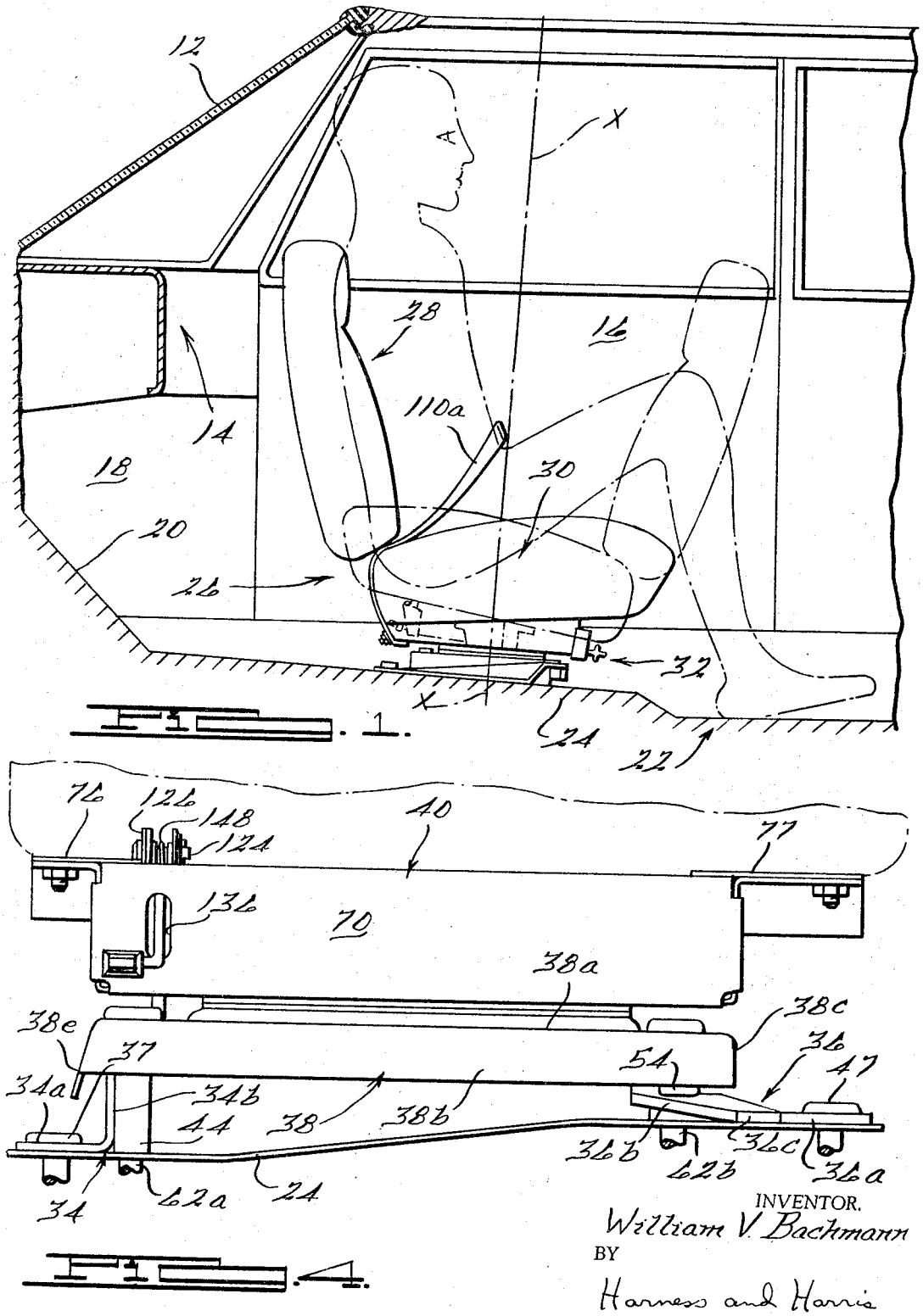

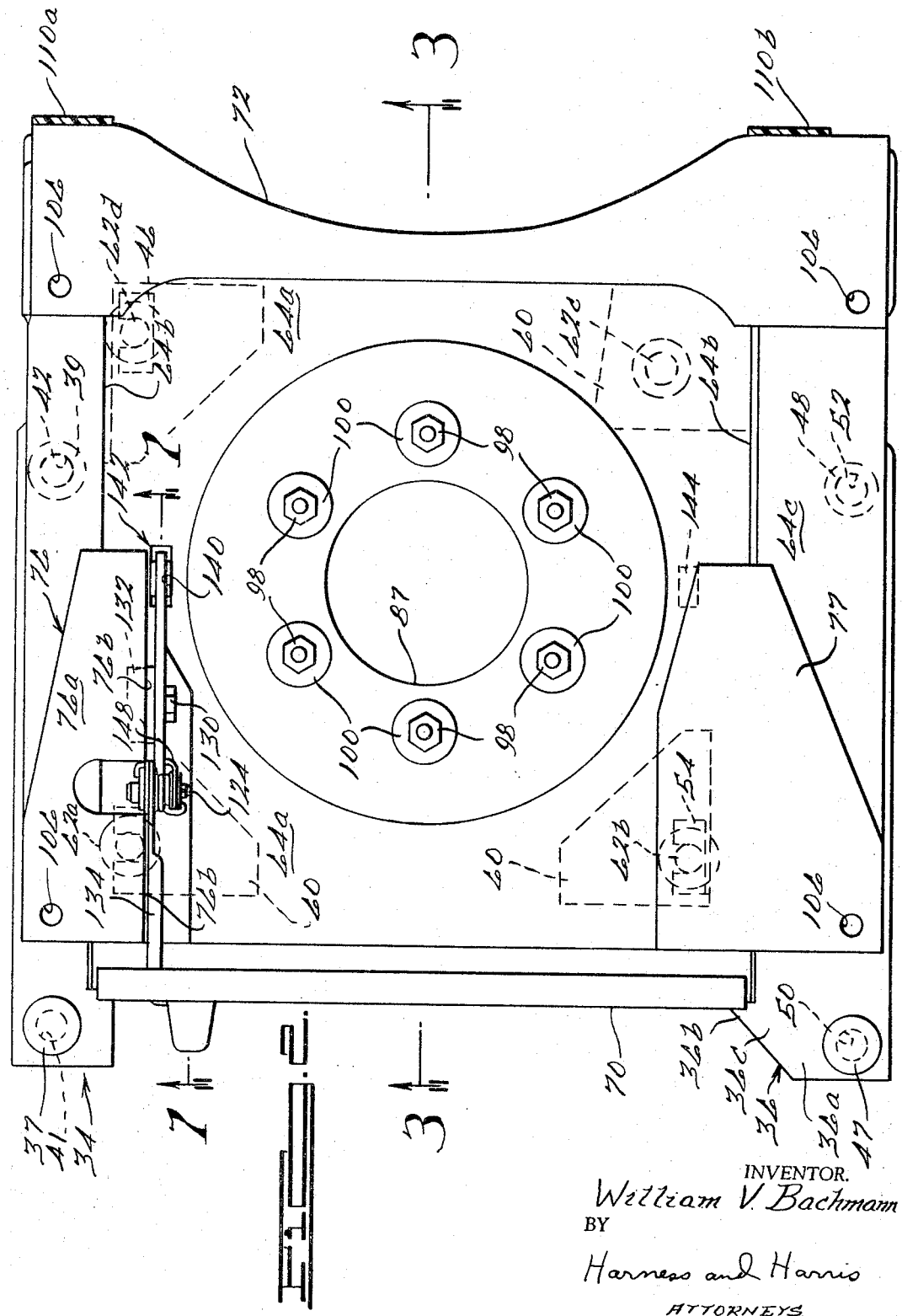

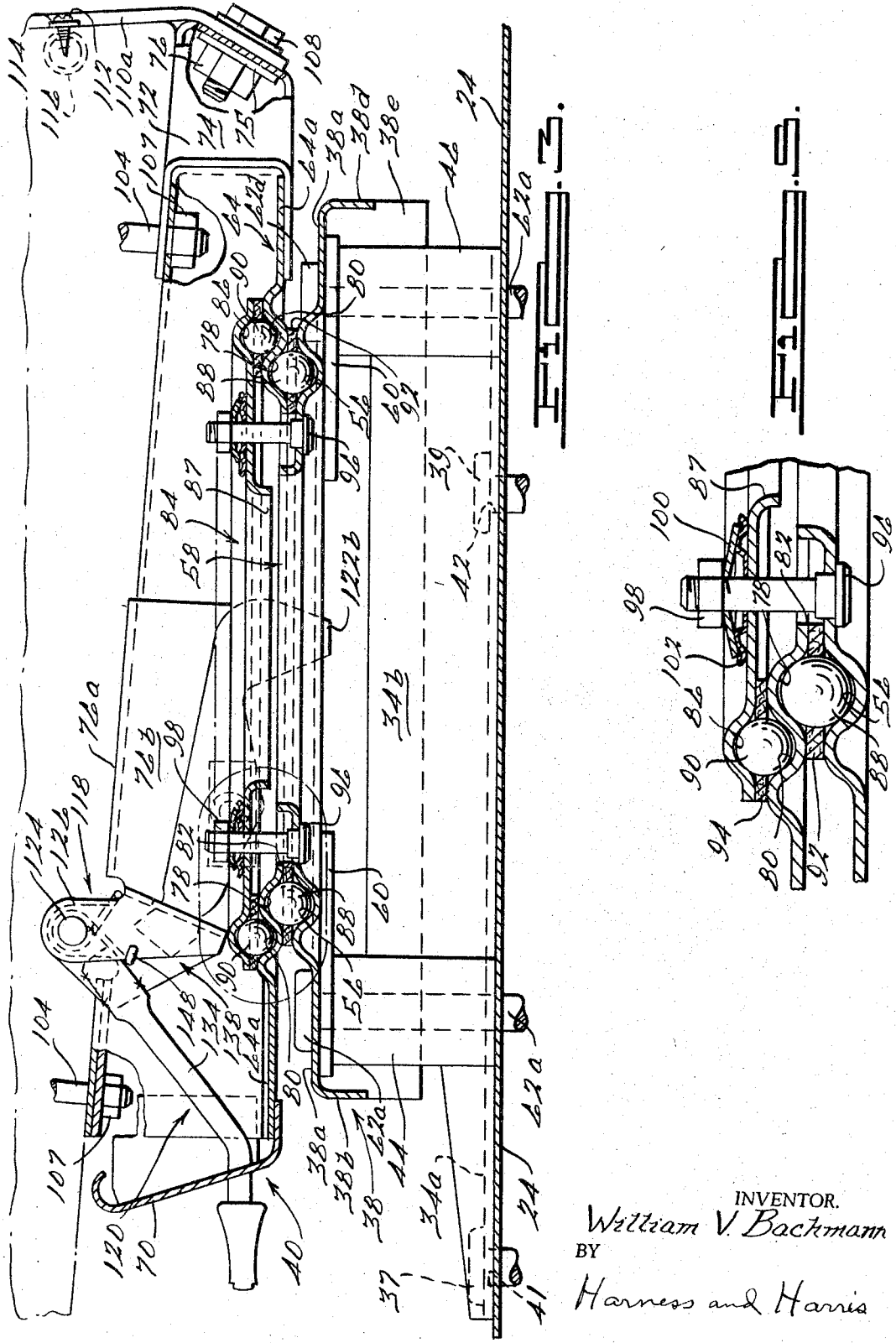

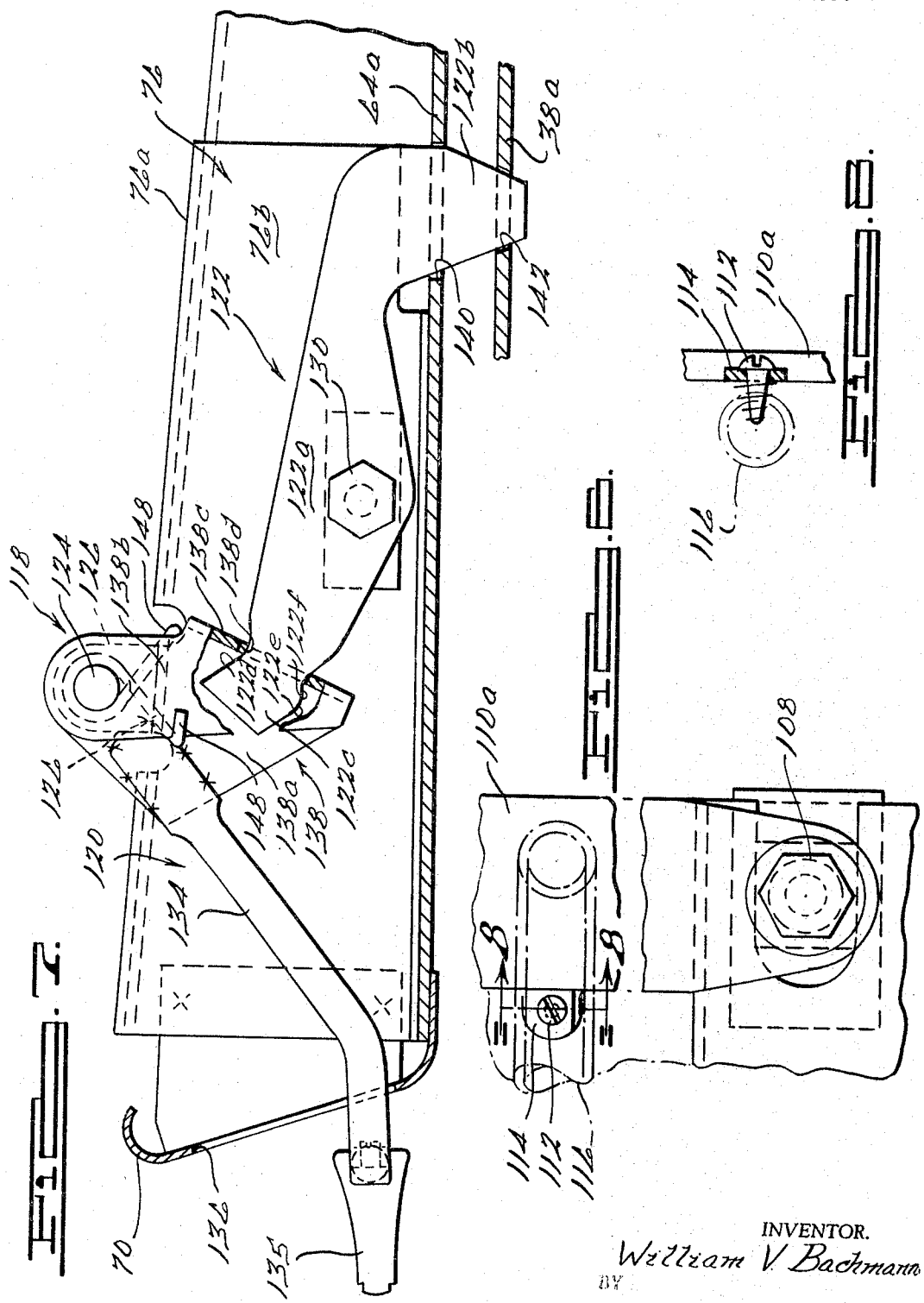

3,322,458
SWIVEL SEAT FOR MOTOR VEHICLE
William V. Bachmann, St. Clair Shores, Mich., assignor to Chrysler Corporation, Highland Park, Mich., a corporation of Delaware
Filed Dec. 8, 1965, Ser. No. 512,351
14 Claims. (Cl. 296—65)

This invention relates to a swivel seat for a motor vehicle. More particularly, it relates to a latching mechanism for an automotive swivel seat.

In a swivel seat for use in a motor vehicle, it is necessary to provide means to selectively latch the seat assembly in any one of a plurality of angularly varying positions. These latch means must hold the seat assembly firmly in the selected angular position and must be readily releasable to allow movement of the assembly to a new position. It is also important, especially in a swivel seat assembly capable of full circle rotation, that the latch means be extremely resistant to accidental or forced release as, for example, in a collision.

Accordingly, it is an object of the present invention to provide an improved latch mechanism for a swivel seat.

A more specific object is to provide a latch mechanism especially suitable for use with a swivel seat in a motor vehicle.

Yet a more specific object is to provide a latch mechanism for an automotive swivel seat which will allow ready and easy voluntary movement to a new position but which will be extremely resistant to accidental release.

In the latch means of the present invention, a latching lever and an operating lever are pivotally mounted on the seat bottom on parallel but spaced axes and a free end of the latching lever is slidably received in a generally radially extending slot in the operating lever so that pivotal movement of the operating lever by an ocupant selectively pivots the latching lever to move a laterally projecting prong portion on the latching lever into and out of a position of latching coaction with an aperture in the swivel base structure, while accidental movement of the prong portion out of the aperture is precluded by the generally right angular abutment of the free end of the latching lever against the radially outer edge of the slot in the operating lever. More specifically, the operating and latching levers are dimensioned and relatively pivoted so that a force tending to move the prong portion on the latching lever out of the aperture on the swivel base structure causes the free end of the latching lever to press against the radially outer edge of the slot in the operating lever with a force whose line of action passes generally adjacent the pivotal axis of the operating lever so that the latching lever is "hung up" on the operating lever and precluded from accidental movement out of its position of latching coaction with the aperture in the swivel base structure.

These and other objects, features and advantages of the invention will be apparent from the following detailed description of a preferred embodiment of the invention and from the accompanying drawings in which:

FIG. 1 is a fragmentary sectional view of a motor vehicle embodying a swivel seat according to the invention;

FIG. 2 is a plan view of the swivel base structure of the swivel seat of FIG. 1;

FIG. 3 is a sectional view of the swivel base structure of FIG. 2 taken on line 3—3 of FIG. 2;

FIG. 4 is an end view of the swivel base structure of FIG. 2;

FIG. 5 is a view on an enlarged scale of the swivel base structure within the dotted circle of FIG. 3; and FIG. 6 is a fragmentary detail view looking in the direction of the arrow 6 in FIG. 3;

FIG. 7 is a fragmentary sectional view taken on line 7—7 of FIG. 2; and

FIG. 8 is a fragmentary sectional view taken on line 8—8 of FIG. 7.

The motor vehicle seen fragmentarily in FIG. 1 includes a roof 10, a windshield 12, an instrument panel 14, a door 16, a cowl side panel 18, a toe board 20, and a floor pan 22 including a forward floor portion 24.

Forward floor portion 24 supports a swivel seat assembly 26 comprising the front passenger seat of the motor vehicle. Seat assembly 26 includes a seat back 28, a seat bottom 30, and a swivel base structure seen generally at 32.

Particular reference is now made to FIGS. 2, 3 and 4. Base structure 32 includes right and left adapter plates 34, 36, a lower stationary platform 38, and an upper swiveling platform 40.

Right adapter plate 34 includes a base portion 34a and an upstanding rib portion 34b. Bolts 37, 39 pass through holes 41, 42 in base portion 34a and through aligned, longitudinally spaced holes in floor portion 24 to secure adapter plate 34 to floor portion 24 in a position extending generally parallel to the longitudinal axis of the vehicle. Forward and rearward risers 44, 46 are welded to the inboard face of rib portion 34b.

Left adapter plate 36 includes a base portion 36a, a mounting portion 36b, and a twisted bridge portion 36c connecting base portion 36a and mounting portion 36b. Bolts 47, 48 pass through holes 50, 52 in base portion 36a and through aligned, longitudinally spaced holes in floor portion 24 to secure adapter plate 36 to floor portion 24 in a position extending generally parallel to adapter plate 34. A riser 54 is welded to the forward upper face of mounting portion 36b Lower platform 38 is a single piece structure comprising a generally rectangular and generally horizontal mounting portion 38a and skirt portions 38b, c, d, and e depending integrally from the four sides of portion 38a to form therewith a downwardly opening, box-like structure.

Mounting portion 38a is radially crimped to form lower annular ball bearing race 56. Portion 38a also includes a central lightening hole 58 concentrically within race 56. A reinforcing pad 60 is welded to the underface of mounting portion 38a adjacent the four corners of the latter and four studs 62a, b, c and d are welded to the four corners of portion 38a and project downwardly therefrom through aligned apertures in portion 38a and the underlying pads 60. Studs 62a, b, and d pass through slots provided in risers 44, 46 and 54 and through holes in floor portion 24. Stud 62c passes directly through a locally elevated section of floor portion 24. Studs 62 are engaged beneath floor portion 24 by nuts to fixedly secure lower platform 38 to adapter plates 34, 36 and provide a firm foundation to receive upper swiveling platform 40.

Platform 40 includes a main plate 64, a front cover 70, and a rear cover 72. Plate 64 includes a generally rectangular and generally horizontal mounting portion 64a, side wall portions 64b upstanding from either longitudinal edge of mounting portion 64a, and raised wing portions 64c extending laterally outwardly from wall portions 64b.

Cover plate 70 is of relatively thin gauge and is welded to the forward end of main plate 64; rear cover 72 comprises a relatively heavy gauge U-channel and is welded to the rearward end of main plate 64. The central section of the web portion 74 of channel 72 is bowed inwardly to provide additional rear seat foot room. Reinforcing plates 75 are welded to the inner face of web portion 74 at each end of the latter and nuts 76 are welded to reinforcing plates 75. A reinforcing angle bracket 76 is welded to one wing portion 64c and to the adjacent upper face of mounting portion 64a. Another angle bracket 77 is welded to the other wing portion 64c and to mounting portion 64a.

Mounting portion 64a is doubly crimped to form an upper annular ball bearing race 78 and a lower annular ball bearing race 80. Portion 64a also includes a central lightening hole 82.

Swivel base structure 32 also includes a disc 84. Disc 84 is radially crimped to provide an upper annular ball bearing race 86; disc 84 also includes a central lightening hole 87.

In the assembled relationship of the swivel base structure (best seen in FIG. 5), lower bearing race 56 of mounting portion 38a and upper bearing race 78 of mounting portion 64a are radially aligned to rollably receive therebetween a plurality of relatively large diameter steel balls 88, and upper bearing race 86 of disc 84 and lower bearing race 80 of mounting portion 64a are radially aligned to rollably receive therebetween a plurality of relatively small diameter steel balls 90.

A ring member 92, corresponding in mean diameter to races 56 and 78, is positioned betwen mouting portion 38a and mounting portion 64a. Member 92 is formed of hard felt or similar material. The material comprising member 92 preferably has a sandwich construction comprising a core of hard felt bounded top and bottom by polyethylene layers. Such a material is available from Western Felt Works of Chicago, Ill., as style No. 40–3. Member 92 is provided with a plurality of circumferentially spaced holes receiving balls 88 to maintain the latter in circumferentially spaced relation within races 56, 78. A similar ring member 94, formed of the same material as member 92, serves to space balls 88 within race 80, 86.

The various swivel base structure elements are maintained in their assembled relationship by a plurality of bolts 96 which pass through aligned holes in mounting portion 38a and disc 84 for threaded engagement with nuts 98. Each bolt and nut assembly also includes a relatively stiff lock washer 100 and a relatively resilient lock washer 102. Nuts 98 are torqued to an extent to firmly clamp the entire assembly and yet allow free swiveling movement of upper platform 40 on lower platform 38. In the clamped relationship, ring members 92, 94 serve to space the associated steel balls, seal the ball races against the entry of grit or other foreign matter and prevent the escape of lubricant.

Seat bottom 30 is secured to upper platform 40 by four studs 104 which project downwardly from the seat bottom and pass through holes 106 provided at the four corners of the upper face of platform 40. Nuts 107 engage the lower ends of studs 104.

Screw bolts 108 pass through aligned holes in web portion 74 of U-channel 72 and reinforcing plates 75 and threadably engage weld nuts 76 to anchor the lower ends of seat belt halves 110a, 110b to swiveling upper platform 40. From their lower anchored ends, seat belt halves 110a, 110b extend upwardly adjacent the rear face of seat bottom 30 and thereafter pass between the upper rear surface of the seat bottom and the lower edge of the seat back where they may be coupled together by an occupant in known manner. The belt halves are held in their upwardly extending position adjacent the rear face of the seat bottom by screws 112 which pass through metallic tabs 114 projecting laterally inwardly from the seat belt halves. Screws 112 pierce the fabric covering of seat bottom 30 and thread into a metal tube 116 forming the rear transverse frame member of the seat bottom.

The described swivel structure thus mounts seat assembly 26 for pivotal movement about a generally vertical axis.

A latching assembly, seen generally at 118, is provided to selectively latch the seat assembly in a generally forwardly facing position or in a generally rearwardly facing position.

Assembly 118 includes an operating lever 120 and a latching lever 122. Operating lever 120 is pivoted on a pin 124 carried on a prong 126 struck from the upper horizontal portion 76a of wing angle bracket 76. Latching lever 122 is pivoted on a screw bolt 130 passing through vertical portion 76b of bracket 76 for threaded engagement with a nut 132 welded to the outboard face of bracket portion 76b. Pin 124 and bolt 130 thus mount levers 120 and 122 for pivotal movement on parallel but spaced axes.

Operating lever 120 includes a handle portion 134 projecting through a slot 136 in cover plate 70 and capped with a knob 135, and a depending portion 138 generally in the form of a clevis. Clevis 138 includes spaced arm portions 138a, 138b, and a bridge or web portion 138c interconnecting the arm portions. Handle portion 134 is welded to arm portion 138a.

Latching lever 122 includes an elongated main body portion 122a and a tapered prong portion 122b projecting generally laterally from main body portion 122a adjacent one end of the latter. Prong portion 122b passes freely through a slot 140 in mounting portion 64a for wedging, locking engagement with one or the other of a pair of diametrically opposed slots 142, 144 in mounting portion 38a. Web portion 138c of clevis 138 is provided with a slot 138d loosely and slidably receiving an end section 122c of main body portion 122a. The top or radially innermost end surface of slot 138d is thus positioned adjacent the top edge surface 122d of end section 122c while the bottom or radially outermost end surface of slot 138d is positioned adjacent the bottom edge surface 122e of end section 122c.

Pivotal movement of handle portion 134 in a counterclockwise direction as viewed in FIG. 7 will bring a point on the bottom end surface of slot 138d into contact with a point on bottom edge surface 122e and thereby pivot latching lever 122 clockwise to move prong portion 122b into a position of wedging, latching coacting with slot 142 or 144. Pivotal movement of handle portion 134 in a clockwise direction will bring the top end surface of slot 138d into contact with top edge surface 122d and thereby pivot latching lever 122 counterclockwise to move prong portion 122b upwardly to a position clear of slot 142 or 144. A coil spring 148, wound around pivot pin 124 and anchored against prong 126 and clevis 138, acts through clevis 138 to continuously urge prong portion 122b in a downwardly or latching direction. Thus, the only operator manipulation required is an upward pull on knob 135 to clear prong portion 122b from slot 142 or 144. The seat assembly may then be provided to its opposite position, whereupon spring 148 will act automatically through clevis 138 to move prong portion 122b downwardly into its new position of latching coaction with the other slot 142 or 144.

While the latching mechanism of the invention thus allows easy release of the latching elements for swiveling movement of the seat to a new position, it is extremely resistant to accidental release or disengagement of the latching elements. In the event of a collision, for example, a large force will be generated tending to pivot the upper swiveling platform, together with the seat bottom and seat back, about the central axis of the seat assembly. This force will be resisted only by the latching engagement of the prong portion 122b with slot 142 or 144. As the upper platform tries to rotate relative to the lower fixed platform, the lower platform will apply a force to prong portion 122b which, due to the taper of the side edges of prong portion 122b, will have a component in an upward direction. A collision will thus produce a substantial force tending to force prong portion 122b upwardly out of slot 142 or 144. Such upward or unlatching displacement is positively precluded, however, by the engagement of bottom edge surface 122e with the bottom end surface of slot 138d. Specifically, the operating and latching levers are dimensional and relatively pivoted so the arcuate path or orbit of the point of contact on bottom edge surface 122e intersects the arcuate path or orbit of the point of contact on the bottom end surface of slot 138d generally at right angles so that the line of action of the force transmitted to clevis 138 upon application of an upward force against prong portion 122b passes generally adjacent the pivotal axis of clevis 138. Latching lever 122 is thus "hung up" on operating lever 120 to preclude unlatching upward displacement of prong portion 122b.

In the disclosed embodiment, the line of action of the force applied to clevis 138 passes only adjacent to, rather than directly through, the pivotal axis of the operating lever. Accordingly, a notch 122f is provided in lower edge 122e to preclude sliding movement of lower edge 122e on the bottom end surface of slot 138d such as might otherwise occur as a result of the slight displacement of clevis 138 from its bottom dead center position with respect to lever 122.

While a preferred embodiment of the invention has been illustrated and described in detail, it is to be understood that various changes may be made in the disclosed embodiment without departing from the scope or spirit of the invention as defined by the appended claims.

I claim:

1. In a seat assembly comprising a fixed base structure, a seat bottom mounted for movement on said base structure, and latch means for releasably securing said seat bottom on said base structure in at least one position; the improvement wherein said latch means includes;
   (A) a first member mounted on said seat bottom for pivotal movement about a first axis and having
      (1) an elongated main body portion carrying said first axis and
      (2) a prong portion projecting generally laterally from said main body portion
         (a) at a location thereon spaced longitudinally from said first axis and
         (b) in a direction generally normal to said first axis;
   (B) means on said base structure defining at least one aperture extending, with said seat bottom in said one position, across a portion of the arcuate path of said prong portion so that the latter is moved selectively into and out of said aperture as said first member is selectively pivoted about said first axis; and
   (C) a second member mounted on said seat bottom for pivotal movement about a second axis spaced from but generally parallel to said first axis and having
      (1) a handle portion projecting in a direction generally normal to said second axis to a location accessible to an occupant of said seat bottom,
      (2) a first surface spaced radially from said second axis and
      (3) a second surface spaced radially beyond said first surface to define an open area therebetween loosely and slidably receiving an end section of said main body portion spaced longitudinally from said first axis, whereby pivotal movement of said handle portion in one direction brings a point of one of said surfaces into contact with a point on an edge surface of said end section to move said prong portion into a position of latching coaction with said aperture and pivotal movement of said handle portion in the opposite direction brings the other of said surfaces into engagement with an opposite edge surface of said end section to move said prong portion out of latching coaction with said aperture,
      (4) said first and second surfaces being so arranged relative to said second axis that the line of action of the force transmitted to said second member upon application of a force to said prong portion tending to move the latter out of said aperture passes generally adjacent said second axis.

2. A seat assembly according to claim 1 wherein
   (A) said one surface is said second surface and
   (B) and said pivot axes are relatively positioned on said seat bottom so that the arcuate path of the point of contact on said second surface intersects the arcuate path of the related point of contact on said end section generally at right angles so that the line of action of the force transmitted to said second member upon application of a force to said prong portion tending to move the latter out of said aperture passes generally adjacent said second axis.

3. A seat assembly according to claim 2 wherein said second member comprises a first class lever having said prong portion at one end and said end section at the other end.

4. A seat assembly according to claim 2 wherein said first and second surfaces are defined as the respective end surfaces of a slot provided in said second member.

5. A seat assembly according to claim 2 and further including spring means constantly biasing said second member for pivotal movement in a direction to press said second surface against the adjacent edge surface of said end section and urge said prong portion toward its position of latching coaction with said aperture.

6. A seat assembly according to claim 1 wherein said seat bottom is mounted for swiveling movement on said base structure.

7. In a motor vehicle comprising a body structure including a passenger compartment having a floor, a fixed base structure on said floor, a seat bottom mounted for movement on said base structure, and latch means for releasably securing said seat bottom on said base structure in at least one position; the improvement wherein said latch means includes:
   (A) a first member mounted on said seat bottom for pivotal movement about a first axis and having
      (1) an elongated main body portion carrying said first axis and
      (2) a prong portion projecting generally laterally from said main body portion
         (a) at a location thereon spaced longitudinally from said first axis and
         (b) in a direction generally normal to said first axis;
   (B) means on said base structure defining at least one aperture extending, with said seat bottom in said one position, across a portion of the arcuate path of said prong portion so that the latter is moved selectively into and out of said aperture as said first member is selectively pivoted about said first axis; and
   (C) a second member mounted on said seat bottom for pivotal movement about a second axis spaced from but generally parallel to said first axis and having
      (1) a handle portion projecting in a direction generally normal to said second axis to a location accessible to an occupant of said seat bottom,
      (2) a first surface spaced radially from said second axis and
      (3) a second surface spaced radially beyond said first surface to define an open area therebetween loosely and slidably receiving an end section of said main body portion spaced longitudinally from said first axis, whereby pivotal movement of said handle portion in one direction brings a point of one of said surfaces into contact with a point on an edge surface of said end section to move said prong portion into a position of latching coaction with said aperture and pivotal movement of said handle portion in the opposite direction brings the other of said surfaces into engagement with an opposite edge surface of said end section to move said prong portion out of latching coaction with said aperture, (4) said first and second surfaces being so arranged relative to said second axis that the line of action of the force transmitted to said second member upon application of a force to said prong portion tending to move the latter out of said aperture passes generally adjacent said second axis.

8. A motor vehicle according to claim 7 wherein
(A) said one surface is said second surface and
(B) and said pivot axes are relatively positioned on said seat bottom so that the arcuate path of the point of contact on said second surface intersects the arcuate path of the related point of contact on said end section generally at right angles so that the line of action of the force transmitted to said second member upon application of the force to said second member upon application of a force to said prong portion tending to move the latter out of said aperture passes generally adjacent said second axis.

9. A motor vehicle according to claim 8 wherein said second member comprises a first class lever having said prong portion at one end and said end section at the other end.

10. A motor vehicle according to claim 8 wherein said first and second surfaces are defined as the respective end surfaces of a slot provided in said second member.

11. A motor vehicle according to claim 8 and further including spring means constantly biasing said second member for pivotal movement in a direction to press said second surface against the adjacent edge surface of said end section and urge said prong portion toward its position of latching coaction with said aperture.

12. A motor vehicle according to claim 8 wherein said seat bottom is mounted for swiveling movement on said base structure.

13. A motor vehicle according to claim 12
(A) wherein said motor vehicles includes
  (1) a rear seat,
  (2) a front driver's seat, and
  (3) a front passenger seat, and
(B) wherein said seat assembly comprises said front passenger seat.

14. A motor vehicle according to claim 12 wherein said latch means are operative to releasably secure said seat bottom to said base structure in a first position facing generally forwardly within said motor vehicle and in a second position facing generally rearwardy within said motor vehicle.

References Cited
UNITED STATES PATENTS

| | | | |
|---|---|---|---|
| 1,682,989 | 9/1928 | Smether | 297—349 |
| 2,888,889 | 6/1959 | Courson | 292—126 |

BENJAMIN HERSH, *Primary Examiner.*

J. H. BRANNEN, *Assistant Examiner.*